United States Patent
Michihata et al.

(10) Patent No.: US 9,696,821 B2
(45) Date of Patent: Jul. 4, 2017

(54) DATA INPUT SYSTEM, ACTIVE STYLUS AND METHOD OF CONTROLLING OF ACTIVE STYLUS

(71) Applicant: Kabushiki Kaisha Toshiba, Tokyo (JP)

(72) Inventors: Saori Michihata, Sagamihara Kanagawa (JP); Toshiya Takano, Sagamihara Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 209 days.

(21) Appl. No.: 14/562,455

(22) Filed: Dec. 5, 2014

(65) Prior Publication Data

US 2015/0309599 A1    Oct. 29, 2015

(30) Foreign Application Priority Data

Apr. 25, 2014  (JP) ................... 2014-090999

(51) Int. Cl.

| | |
|---|---|
| *G06F 3/045* | (2006.01) |
| *G06F 3/0354* | (2013.01) |
| *G06F 3/041* | (2006.01) |
| *G06F 1/32* | (2006.01) |

(52) U.S. Cl.
CPC ........ *G06F 3/03545* (2013.01); *G06F 1/3259* (2013.01); *G06F 3/0416* (2013.01); *Y02B 60/1253* (2013.01)

(58) Field of Classification Search
CPC .................................. Y02B 60/1253
USPC ........................................... 345/174
See application file for complete search history.

(56) References Cited

U.S. PATENT DOCUMENTS

| | | | |
|---|---|---|---|
| 5,889,237 | A | 3/1999 | Makinwa |
| 2004/0032399 | A1 | 2/2004 | Sekiguchi et al. |
| 2012/0256830 | A1 | 10/2012 | Oda et al. |

FOREIGN PATENT DOCUMENTS

| | | |
|---|---|---|
| JP | 09-509514 | 9/1997 |
| JP | 2004-078496 | 3/2004 |
| JP | 2012-221304 | 11/2012 |
| JP | 2013-218453 | 10/2013 |

*Primary Examiner* — Gustavo Polo
(74) *Attorney, Agent, or Firm* — Rutan & Tucker, LLP

(57) ABSTRACT

According to one embodiment, a data input system includes an active stylus and an apparatus. The active stylus switches a mode from a first mode in which the signal is output with a first transmission interval to a second mode in which the signal is output with a second transmission interval longer than the first transmission interval when a pressure in a handwriting input operation is not detected for more than a first period. The apparatus displays an object indicative of a position pointed to by the active stylus based on the signal. The apparatus maintains, when the active stylus is in the second mode, a display state of the object displayed on the basis of the signal output at a first timing until the signal is output at a second timing following the first timing.

10 Claims, 3 Drawing Sheets

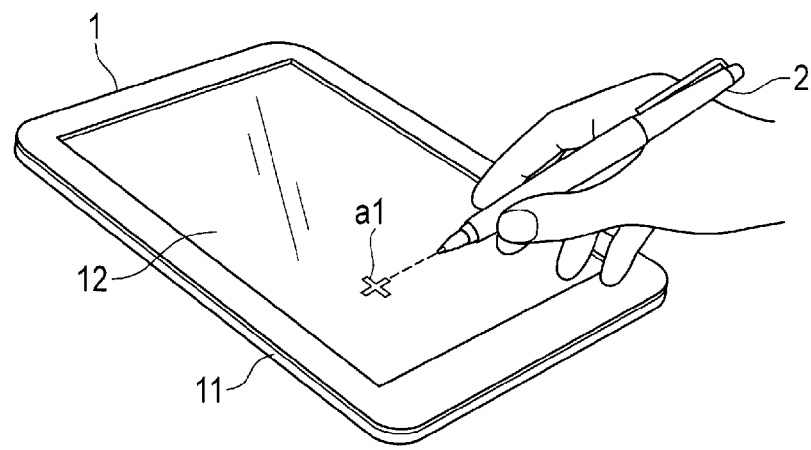
F I G. 1
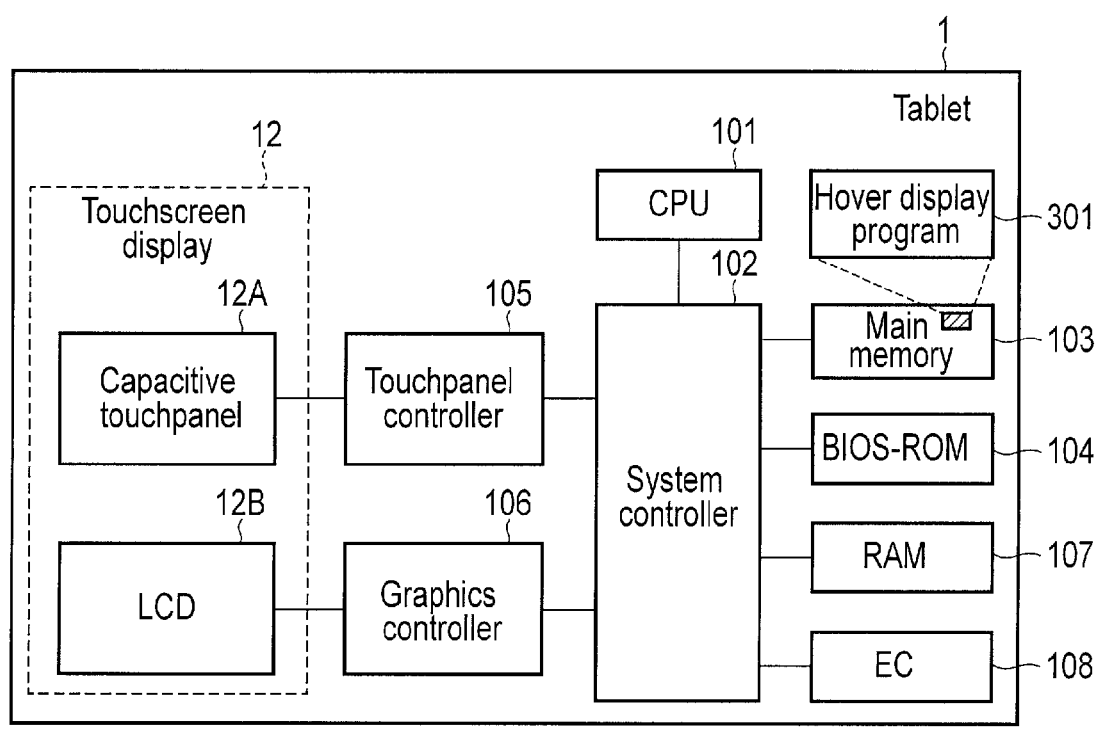
F I G. 2

DATA INPUT SYSTEM, ACTIVE STYLUS AND METHOD OF CONTROLLING OF ACTIVE STYLUS

CROSS-REFERENCE TO RELATED APPLICATIONS

This application is based upon and claims the benefit of priority from Japanese Patent Application No. 2014-090999, filed Apr. 25, 2014, the entire contents of which are incorporated herein by reference.

FIELD

Embodiments described herein relate generally to a data input system, an active stylus and a method of controlling of an active stylus.

BACKGROUND

In recent years, battery-powered portable device called tablets or phablets have seen widespread adoption. Such devices have a handwriting input function to facilitate input operation by a user. Currently, many devices have a handwriting input function capable of accepting not only input operation on the touchpanel by a finger, but also by a stylus.

When characters are input by use of a stylus on a capacitive touchpanel, there is a problem that the tip of the stylus is thick, and small characters cannot be written in comparison with a digitizer. However, small characters can be written by making the tip of the stylus thin by improving the accuracy of the touchpanel and using an active stylus having a power source (battery). Therefore, attention has focused on character input using an active stylus as a new input interface.

The active stylus has a problem in that the battery soon becomes exhausted if the stylus is always turned on and ready to write. To solve this problem, various methods for saving power such as switching between power-on and power-off by means of a side switch, etc., have been considered.

Some devices capable of input operation by use of an active stylus comprise a function of displaying a mark as a guide at the position on the touchpanel pointed to by the tip of the active stylus, which is not in contact with the touchpanel, based on a transmission signal output by the active stylus. The mark is called, for example, a hover, and the function of displaying the mark as a guide is called, for example, hovering.

It is assumed that the active stylus is shifted to a sleep state in which the transmission signal is not output during an idle period (i.e., if writing is not executed for more than a certain time) and stops the output of the transmission signal to save power. In this case, however, the hovering function of displaying the hover as a guide on the touchpanel is not effectively activated until the active stylus exits the sleep state and the output of the transmission signal is resumed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing an appearance of a tablet and an active stylus constituting a data input system of an embodiment.

FIG. 2 is an exemplary view showing a system configuration of the tablet of the embodiment.

DETAILED DESCRIPTION

Figure 3:
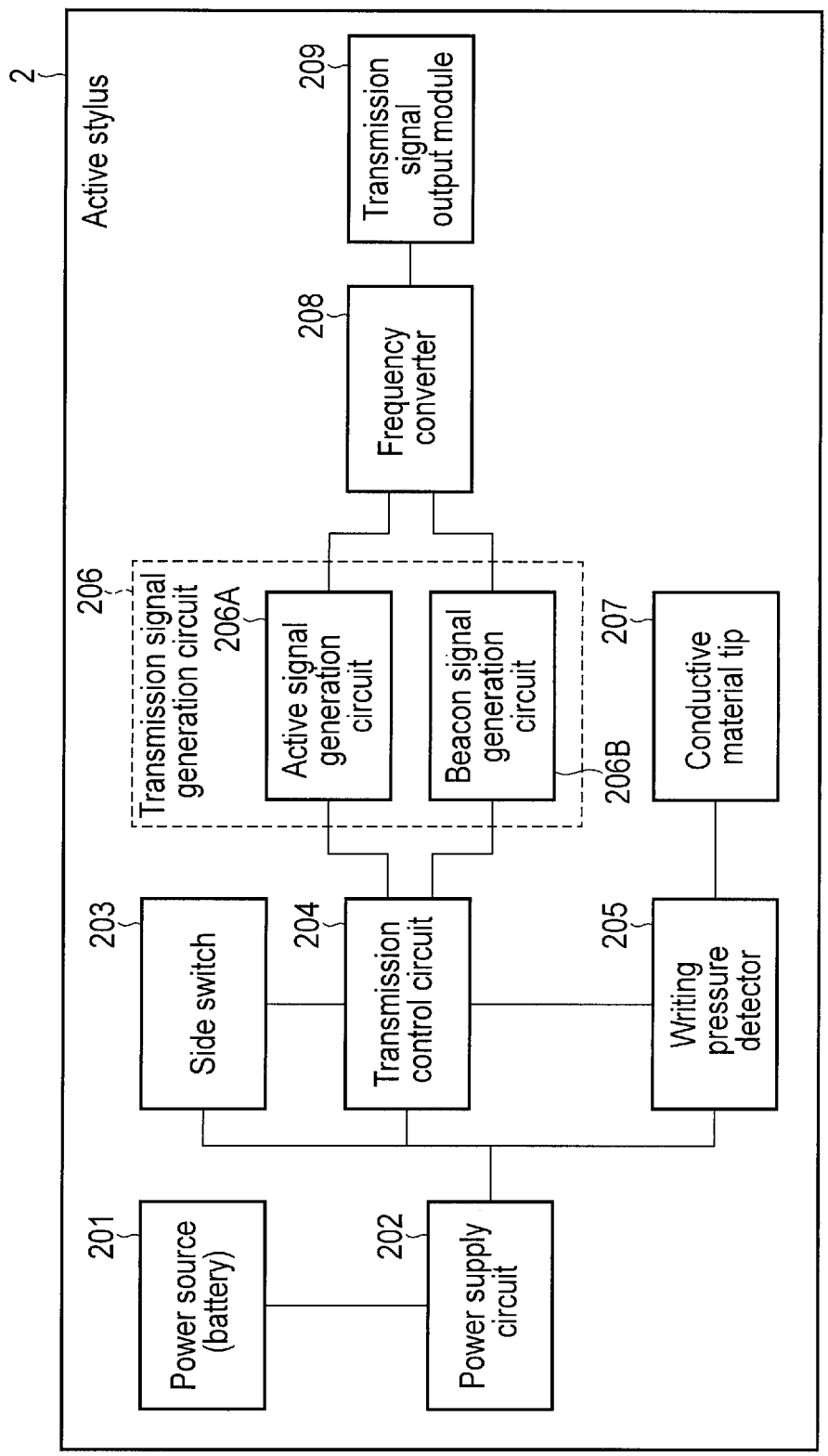
FIG. 3 is an exemplary view showing a system configuration of the active stylus of the embodiment.

Various embodiments will be described hereinafter with reference to the accompanying drawings.

In general, according to one embodiment, a data input system comprises an active stylus and an apparatus comprising a sensor to detect a signal of the active stylus. The active stylus comprises an output controller, a pressure sensor and a controller. The output controller is configured to output a wireless signal. The pressure sensor is configured to detect a pressure in a handwriting input operation. The controller is configured to switch the active stylus from a first mode to a second mode when the pressure is not detected by the pressure sensor for more than a first period. The first mode is a mode in which the output controller outputs the wireless signal with a first transmission interval. The second mode is a mode in which the output controller outputs the wireless signal with a second transmission interval longer than the first transmission interval. The apparatus comprises a display controller. The display controller is configured to display an object indicative of a position pointed to by the active stylus which is not in contact with an operation surface based on the wireless signal output from the active stylus. The display controller is configured to maintain, when the active stylus is in the second mode, a display state of the object displayed on the operation surface based on the wireless signal output at a first timing until the wireless signal is output at a second timing following the first timing.

FIG. 1 is an exemplary view showing an appearance of a tablet 1 and an active stylus 2 constituting a data input system of one of the embodiments.

As shown in FIG. 1, the tablet 1 comprises a body 11 and a touchscreen display 12. The touchscreen display 12 is attached to the body 11 to overlap the top surface of the body 11.

The body 11 has a thin box-shaped housing. A flat-panel display and a sensor which detects a contact position of the active stylus 2 on the flat-panel display are incorporated into the touchscreen display 12. The sensor is a capacitive touchpanel and comprises a function of supporting the active stylus 2. The flat-panel display is, for example, an LCD. The touchpanel is provided to cover a screen of the flat-panel display.

The tablet 1 comprises a function (hovering) of displaying a mark (hover) a1 as a guide at a position on the touchscreen display 12 pointed to by the tip of the active stylus 2 which is not in contact with the touchscreen display 12 based on a transmission signal output from the active stylus 2. The data input system is configured to effectively activate the hovering function of the tablet 1 even if the active stylus 2 is in a sleep mode, which will be hereinafter described in detail.

FIG. 2 is an exemplary view showing a system configuration of the tablet 1.

As shown in FIG. 2, the tablet 1 comprises a CPU 101, a system controller 102, a main memory 103, a BIOS-ROM 104, a touchpanel controller 105, a graphics controller 106, a RAM 107 and an embedded controller (EC) 108.

The CPU 101 is a processor which controls operations of each module of the tablet 1. The CPU 101 loads various types of software from the RAM 107 into the main memory 103 and executes the loaded software. Various types of software include a hover display program 301 to provide the hovering function described above. The CPU 101 also executes a basic input/output system (BIOS) stored in the BIOS-ROM 104. The BIOS is a program for hardware control.

The system controller 102 is a device which connects a local bus of the CPU 101 with each component. A memory controller which executes access control of the main memory 103 is built in the system controller 102. The system controller 102 comprises a function of executing communication with the touchpanel controller 105 and the graphics controller 106 via, for example, a serial bus.

The touchpanel controller 105 is a device which inputs a contact position of the active stylus 2 on the touchscreen display 12 detected by a touchpanel 12A. The touchpanel 12A can receive a transmission signal (carrier) output from the active stylus 2 and detect a reception position of the signal on the touchscreen display 12, and the touchpanel controller 105 also inputs positional information on this position. The hover display program 301 acquires the positional information and displays a hover at a corresponding position on the touchscreen display 12. The touchpanel 12A detects the transmission signal when a distance between the active stylus 2 and the touchpanel 12A is, for example, 20 mm. The distance differs according to detection accuracy of the touchpanel 12A and transmission intensity of the transmission signal. It is assumed that communication between the active stylus 2 and the touchpanel 12A is not interactive and a signal is transmitted in a single direction from the stylus to the panel in the present embodiment, but the communication may be interactive.

The graphics controller 106 is a device which controls the LCD 12B. The LCD 12B displays a screen image based on a display signal generated by the graphics controller 106.

The EC 108 is a single-chip microcomputer including a controller for power management. The EC 108 comprises a function of powering on and off the tablet 1 in accordance with a power button operation by a user.

FIG. 3 is an exemplary view showing a system configuration of the active stylus 2.

As shown in FIG. 3, the active stylus 2 comprises a power source (battery) 201, a power supply circuit 202, a side switch 203, a transmission control circuit 204, a writing pressure detector 205, a transmission signal generation circuit 206, a conductive material tip 207, a frequency converter 208 and a transmission signal output module 209.

Each module in the active stylus 2 is operated by power from the power source (battery) 201. The power supply circuit 202 is a circuit which controls supply of the power from the power source (battery) 201 to each module in the active stylus 2. The side switch 203 is an operative unit for powering on and off the active stylus 2.

At this time, the active stylus 2 is assumed to be powered on by an operation of the side switch 203. While powered on, the active stylus 2 is basically in a wake state (wake mode), generates a transmission signal by the transmission signal generation circuit 206 under the control of the transmission control circuit 204, and continuously outputs the generated transmission signal from the transmission signal output module 209 via the frequency converter 208. The transmission signal in the wake mode includes stylus information such as a carrier frequency signal for notifying a position of the stylus in the case of an analog method, a predetermined orthogonal code pattern for synchronization detection in the case of a digital method, a stylus identification number, writing pressure information, etc. The frequency converter 208 is a module which converts the transmission signal to a signal of a predetermined carrier frequency. The carrier frequency will be described later.

When an input operation is executed by the active stylus 2 on the touchscreen display 12, the conductive material tip 207 contacts the touchscreen display 12, and a writing pressure in the input operation is detected by the writing pressure detector 205. When a state where a writing pressure value output by the writing pressure detector 205 is 0 (i.e., a state where the writing pressure is not detected) is continued for a certain time, the active stylus 2 is shifted to a sleep state (sleep mode). The active stylus 2 is returned from the sleep state to the wake state when the conductive material tip 207 contacts the touchscreen display 12 and the writing pressure is detected by the writing pressure detector 205.

Generally, when the active stylus 2 is in the sleep state, the active stylus 2 stops the output of the transmission signal. In this case, however, display of the hover by the hover display program 301 on the side of tablet 1 is not executed. Therefore, the active stylus 2 of the data input system of the present embodiment comprises two signal generation circuits, i.e., an active signal generation circuit 206A which generates a transmission signal in the wake state and a beacon signal generation circuit 206B which generates a transmission signal in the sleep state, and outputs the transmission signal (beacon signal) generated by the beacon signal generation circuit 206B in the sleep state. The transmission signal in the sleep mode is, for example, an orthogonal code for synchronization detection. Patterns of the orthogonal code should preferably differ in the wake state and the sleep state.

Figure 4:
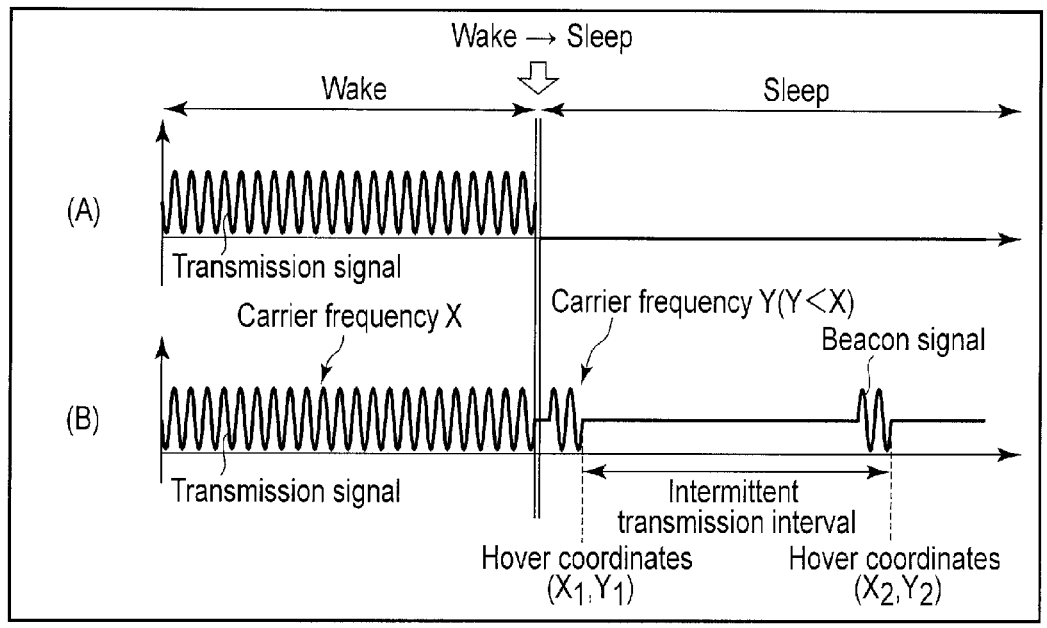
FIG. 4 is an exemplary schematic view for explaining a principle of operation of hover display of the data input system of the embodiment.

FIG. 4 is an exemplary schematic view for explaining the principle of operation of hover display of the data input system.

(A) in FIG. 4 shows an output state of a transmission signal of a conventional active stylus in the wake state and the sleep state. As shown in (A), when the conventional active stylus is shifted from the wake state to the sleep state, the stylus stops the output of the transmission signal. As a result, the hover is not displayed on the side of the tablet.

In contrast, (B) shows an output state of the transmission signal of the active stylus of the data input system of the present embodiment in the wake state and the sleep state. As shown in (B), when the active stylus 2 of the data input system of the present embodiment is shifted from the wake state to the sleep state, the active stylus 2 switches the output operation of the transmission signal from continuous transmission to intermittent transmission (of a beacon signal). As described above, the transmission signal in the wake state is generated by the active signal generation circuit 206A, and the transmission signal (beacon signal) in the sleep state is generated by the beacon signal generation circuit 206B. The active stylus 2 notifies the tablet 1 that the active stylus 2 is in the sleep state via the beacon signal.

When the active stylus pen 2 is shifted to the sleep state, the tablet 1 executes display of the hover on the touchscreen display 12 based on the intermittently output transmission signal (beacon signal). More specifically, even if the transmission signal (beacon signal) is stopped after the transmission signal is received and the hover is displayed at, for example, coordinates $(X_1, Y_1)$, the tablet 1 maintains the display of the hover at the coordinates $(X_1, Y_1)$. When the tablet 1 receives the transmission signal (beacon signal) intermittently output from the active stylus 2, the tablet 1 displays the hover afresh at, for example, coordinates $(X_2, Y_2)$, based on the received transmission signal (beacon signal).

When the active stylus 2 is shifted to the sleep state, the output operation of the transmission signal is switched from the continuous transmission to the intermittent transmission (of a beacon signal). Therefore, the desired objective of saving power is achieved. Even if the active stylus 2 is in the sleep state, the tablet 1 can display the hover on the touchscreen display 12 based on the intermittently output transmission signal (beacon signal).

The tablet 1 may stop maintaining the display of the hover if the transmission signal is stopped for considerably longer than the interval of the intermittent transmission of the transmission signal (beacon signal). The interval of the intermittent transmission of the transmission signal (beacon signal) should be preferably designed within a range of, for example, several dozen milliseconds, which does not disturb the user.

Furthermore, the active stylus 2 reduces power consumption by making the carrier frequency of the transmission signal (beacon signal) lower than the carrier frequency in the wake state when the active stylus 2 is shifted from the wake state to the sleep state, and achieves further power saving. The carrier frequency in the wake state is generally a high frequency (several hundred KHz to several MHz) so as to resist the influence of noise. Since some influence of noise is allowed in transmission and reception of the transmission signal (beacon signal) for the hover display when the active stylus is in the sleep state, no problem occurs if the carrier frequency is changed to a low frequency. The carrier frequency is changed by the frequency converter 208.

As described above, the active stylus 2 notifies the tablet 1 that the active stylus 2 is in the sleep state via the beacon signal. The tablet 1 receives the notification and changes the carrier frequency.

If the tip of the conventional active stylus in the sleep state is moved to be close to the touchscreen display, there is inconvenience that the hover is not displayed on the touchscreen display until the tip contacts the touchscreen display and the operation is different from the operation in the wake state. In contrast, when the tip of the active stylus 2 is moved to be close to the touchscreen display 12 in the data input system of the present embodiment, even if the active stylus 2 is the sleep state, the hover is displayed on the touchscreen display similarly to the wake state. Therefore, the user does not notice that the active stylus 2 is in the sleep state.

Figure 5:
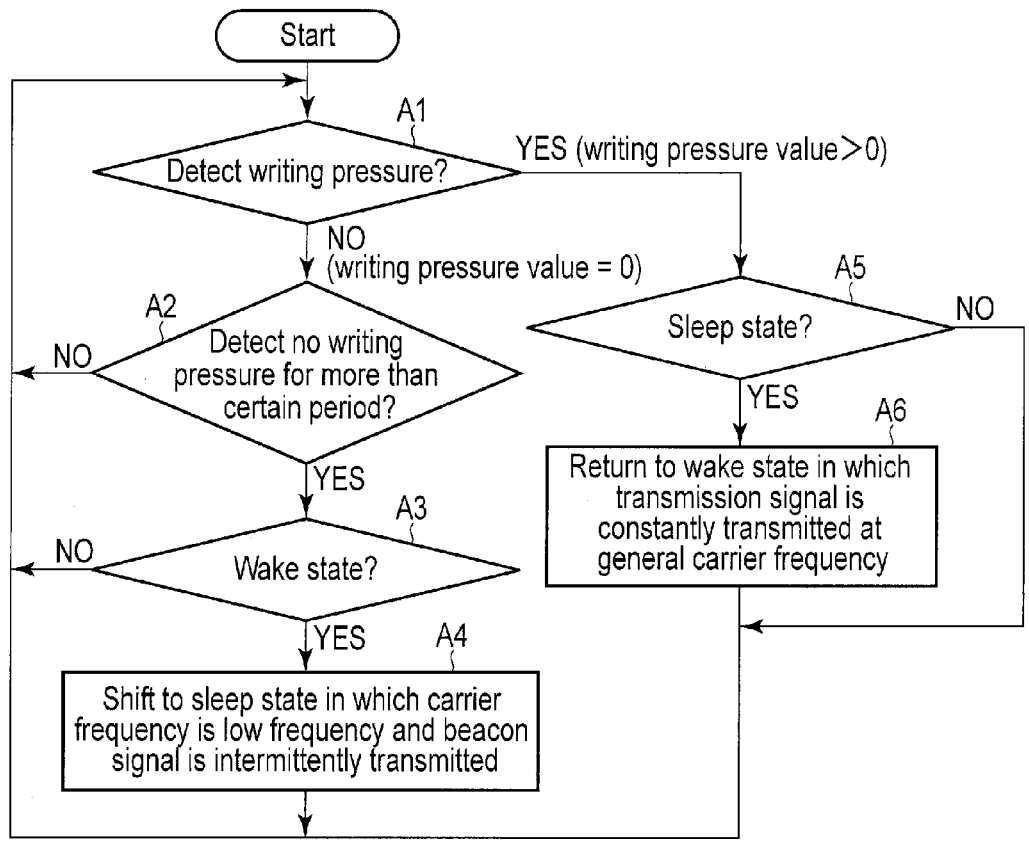
FIG. 5 is an exemplary flowchart showing an operation procedure of the active stylus of the embodiment.

FIG. 5 is an exemplary flowchart showing an operation procedure of the active stylus 2.

The active stylus 2 checks whether the writing pressure is detected or not (block A1). When writing pressure is not detected (NO in block A1), the active stylus 2 checks whether the writing pressure is not detected for more than a certain time (block A2).

When the writing pressure is not detected for more than a certain time (YES in block A2) and the active stylus 2 is in the wake state (YES in block A3), the active stylus 2 is shifted to the sleep state in which the carrier frequency is a low frequency and a beacon signal is intermittently transmitted (block A4).

When the writing pressure is detected (YES in block A1) and the active stylus 2 is in the sleep state (YES in block A5), the active stylus 2 is returned to the wake state in which a transmission signal is continuously transmitted in the general carrier frequency (block A6).

As described above, the data input system of the present embodiment can effectively activate the hovering function even if the active stylus is in the sleep state.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data input system comprising an active stylus and an apparatus comprising a sensor to detect a signal of the active stylus,
    the active stylus comprising:
        an output controller configured to output a wireless signal;
        a pressure sensor configured to detect a pressure in a handwriting input operation; and
        a controller configured to switch the active stylus from a first mode to a second mode when the pressure is not detected by the pressure sensor for more than a first period, the first mode being a mode in which the output controller outputs the wireless signal with a first transmission interval, the second mode being a mode in which the output controller outputs the wireless signal with a second transmission interval longer than the first transmission interval,
    the apparatus comprising a display controller configured to display an object indicative of a position pointed to by the active stylus which is not in contact with an operation surface based on the wireless signal output from the active stylus, the display controller being configured to maintain, when the active stylus is in the second mode, a display state of the object displayed on the operation surface based on the wireless signal output at a first timing until the wireless signal is output at a second timing following the first timing.

2. The system of claim 1, wherein the wireless signal output in the second mode comprises a beacon signal.

3. The system of claim 1, wherein a frequency of a carrier of the wireless signal in the second mode comprises lower than a frequency in the first mode.

4. The system of claim 2, wherein the controller is configured to notify the apparatus whether the active stylus is in the first mode or the second mode via the beacon signal.

5. The system of claim 1, wherein the controller is configured to switch the active stylus from the second mode to the first mode when the pressure is detected by the pressure sensor in the second mode.

6. A method of controlling a data input system that includes an active stylus for a handwriting input operation and a display device, the method comprising:

detecting a writing pressure in the handwriting input operation;

switching the active stylus from a first mode to a second mode when the pressure is not detected for more than a first period, the first mode being a mode in which a wireless signal is output with a first transmission interval, the second mode being a mode in which the wireless signal is output with a second transmission interval longer than the first transmission interval;

displaying an object indicative of a position pointed to by the active stylus which is not in contact with an operation surface of the display device based on the wireless signal output from the active stylus; and maintaining, when the active stylus is in the second mode, a display state of the object displayed on the operation surface based on the wireless signal output at a first timing until the wireless signal is output at a second timing following the first timing.

7. The method of claim 6, further comprising outputting a beacon signal as the wireless signal in the second mode.

8. The method of claim 6, further comprising making a frequency of a carrier of the wireless signal in the second mode lower than a frequency in the first mode.

9. The method of claim 7, further comprising notifying the display device whether the active stylus is in the first mode or the second mode via the beacon signal.

10. The method of claim 6, further comprising switching the active stylus from the second mode to the first mode when the pressure is detected in the second mode.

* * * * *